Patented Dec. 23, 1947

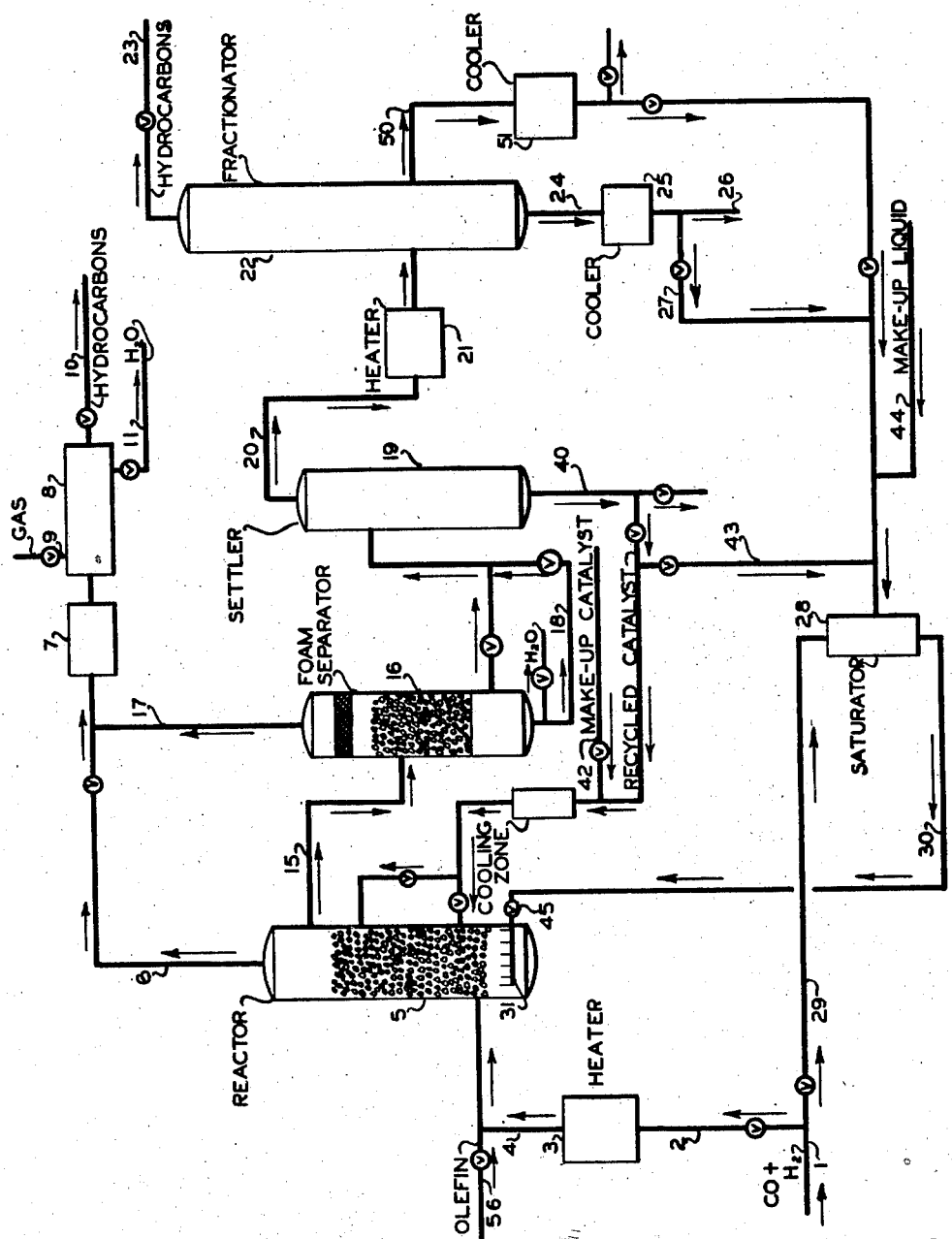

2,433,072

UNITED STATES PATENT OFFICE 2,433,072

METHOD OF EFFECTING CATALYTIC REACTION BETWEEN CARBON MONOXIDE AND HYDROGEN

Meredith M. Stewart, Beacon, Robert C. Garrett, Fishkill, and Eugene E. Sensel, Beacon, N. Y., assignors, by mesne assignments, to The Texas Company, New York, N. Y., a corporation of Delaware Application August 24, 1943, Serial No. 499,772

7 Claims. (Cl. 260—449)

This invention relates to a method of effecting catalytic reactions and involves effecting the reaction by subjecting reactant material to contact with the catalyst in a foam or froth, the contact being effected under predetermined conversion conditions such that the desired reaction is obtained. The catalyst may be a solid or a fluid material dispersed within the foam or froth.

The invention is applicable to catalytic conversion of gaseous reactants by contact with a solid conversion catalyst. In such case the solid catalyst in powdered or finely divided form is suspended or dispersed in a suitable carrier liquid in a reaction zone maintained under reaction conditions and the gaseous reactants are injected in the liquid carrier-catalyst mixture so as to maintain the mixture as a foam or froth during at least a substantial portion of the time that the catalyst and reactants are in contact.

In accordance with the invention a suitable carrier liquid may be saturated with gaseous reactant material at a pressure substantially above that prevailing in the reaction zone. This saturated liquid mixture is introduced to the reactor wherein, due to reduction in pressure, gas is released as bubbles from the liquid causing the liquid to foam. The catalyst may be separately introduced to the reaction zone and dispersed within the foam or may be suspended or dispersed in the carrier liquid prior to or subsequent to the introduction of the carrier liquid to the reaction zone.

When using a solid catalyst it is contemplated having the catalyst in finely powdered form concentrated at or distributed over the gas-liquid interfacial boundaries of the foam thereby permitting highly effective contact between catalyst and reactant gas.

It is also contemplated employing the solid catalyst in a state of sufficiently fine division so that it also serves as a foam stabilizing agent. For example, the catalyst may be ground to an average particle diameter of about 0.01 to 0.001 inch and preferably in the range of 0.001 to 0.0001 inch.

The carrier liquid may be any liquid which is stable and inert under the reaction conditions or may be composed of certain constituents of the reaction products as will be described later.

The invention has particular application to catalytic reactions such as the hydrogenation of carbon oxides, for example, carbon monoxide by the action of a solid catalyst for the production of hydrocarbons and other organic compounds having two or more carbon atoms per molecule.

Accordingly, an important feature of the invention involves effecting conversion of two or more gaseous reactants by the action of a catalyst dispersed in the form of a froth or foam so as to provide an extensive area of liquid-gas interface thereby materially increasing the conversion rate. The invention thus permits carrying out such conversion reactions in simplified and less expensive apparatus.

The invention is therefore advantageous in carrying out the Fischer-Tropsch process which as practiced heretofore has involved certain disadvantages such as complicated and expensive reactor design with low capacity for a given reactor volume, and also difficulty in temperature control.

In order to describe the invention in more detail reference will now be made to the accompanying drawing comprising a diagram of flow illustrating one method of practicing the process as applied to the hydrogenation of carbon monoxide to produce hydrocarbons having two or more carbon atoms per molecule.

Referring to the drawing, carbon monoxide and hydrogen in suitable proportions are conducted from a source not shown through a pipe 1 and passed through a branch pipe 2 to a heater 3 wherein they are heated to a reaction temperature in the range about 250 to 500° F.

The heated gas is then conducted through a pipe 4 leading to the lower portion of a reactor 5. The heated gas is introduced by suitable means such as a plurality of jets or orifices to the interior of the reactor which is maintained filled with a substantial body of catalyst largely dispersed in the form of a foam and to which reference will be made later. The gas is brought into intimate contact with the dispersed catalyst particles during passage through the mass of foam.

Unreacted gas and lighter portions of the products of reaction are continuously drawn off from the top of the reactor 5 through a pipe 6 leading to a cooler and condenser 7 wherein the mixture is cooled to a relatively low temperature such as 100° F. The cooled mixture then passes to a vessel 8 wherein separation occurs between hydrocarbons and water produced in the reaction. Normally gaseous constituents are removed and discharged through a pipe 9. These gaseous constituents may be recycled all or in part to the reactor 5 or may be subjected to suitable treatment for the purpose of effecting separation of unreacted carbon monoxide and hydrogen which may then be recycled to the reaction.

Methane contained in the reaction products may be separated, converted to carbon monoxide and hydrogen and these returned to the reactor 5.

The liquid hydrocarbons are continually drawn off through a pipe 10 while water is discharged through a pipe 11.

A mixture of foam and hydrocarbons is drawn off through a pipe 15 to a foam separator 16. The separator 16 is advantageously provided with a grid or bed of packing material placed in the upper portion thereof to facilitate breaking down of the gas bubbles of the foam so that volatile hydrocarbons contained in the foam may escape therefrom by rising through the grid or packing material into the top of the vessel 16 from which they are discharged through a pipe 17 communicating with the previously mentioned pipe 6.

Within the separator 16 the foam breaks down to a liquid condition so that a body of liquid comprising powdered catalyst suspended in hydrocarbon liquid and liquid suspension medium accumulates in the bottom of the separator. Provision may be made for drawing off any water that passes over into the foam separator. The accumulated liquid is continually drawn off through a pipe 18 to a settler 19 of sufficient capacity to permit the suspended catalyst particles to accumulate in concentrated form in the bottom of the settler while a liquid layer free or substantially free from catalyst accumulates in the upper portion thereof.

A plurality of settling vessels may be employed so that the liquid layer accumulating in the top of the first vessel may be passed to a succeeding vessel to permit further settling. Filtration or centrifugal means may be employed instead of or in conjunction with settling.

In either case the liquid, free or substantially free from catalyst particles, is ultimately conducted through a pipe 20 to a heater 21 wherein it may be raised to a temperature sufficient to facilitate subsequent fractionation. Thus the heated mixture is passed to a fractionator 22 wherein hydrocarbon products of reaction are separated as a distillate fraction which is discharged through a pipe 23.

If desired, the fractionator may be operated so as to produce a plurality of fractions of desired boiling range, provision being made for drawing off side streams, as desired, from the fractionator. Any desired fraction, distillate or residual, may be recycled to the reactor.

The residual fraction of the charge to the fractionator 22 may be drawn off continually through a pipe 24 to a cooler 25 wherein the temperature is reduced to about atmospheric temperature or thereabouts. The cooled residual fraction may be discharged from the system through a pipe 26.

A portion of this residual fraction may be conducted through a branch pipe 27 leading to a saturating vessel 28 to provide the carrier liquid, although for this purpose a distillate fraction removed as a side stream through the pipe 50, cooler 51 and pipe 52 may be used. The saturating vessel may comprise a drum capable of withstanding a pressure substantially above atmospheric or substantially above the pressure prevailing within the reactor 5. For example, the pressure employed in the saturator may range from about 10 to 500 pounds per square inch gauge above the pressure prevailing in the reactor 5. A portion of the carbon monoxide and hydrogen feed is conducted through a pipe 29 to the vessel 28 under a sufficient pressure to saturate the liquid therein. The resulting liquid saturated with the gas under pressure is continually drawn off through a pipe 30 which communicates with a distributor 31 positioned in the bottom portion of the reactor 5.

A plurality of saturating vessels 28 may be employed if desired. Also other gaseous agents besides the feed gases may be used for saturating the liquid in the vessel 28, for example a gas such as carbon dioxide, nitrogen, methane, ethylene, ethane, propane and propylene, etc. It is preferred, however, to use a portion of the feed gas for this purpose and in that case the saturating agent may be carbon monoxide or hydrogen individually or in the form of a mixture such as is suitable for charging to the catalytic conversion reaction.

Referring again to the settler 19, the powdered catalyst is drawn off through a pipe 40 which communicates with a branch pipe 41 through which the catalyst is returned to the reactor by pumping means not shown. If desired, a portion of the catalyst drawn off through the pipe 40 may be discharged from the system or a portion of the catalyst may be subjected to separate treatment to effect regeneration. For example, the catalyst slurry may be subjected to filtration to effect substantially complete separation of liquid from the solid catalyst and then the separated catalyst may be subjected to contact with a regenerating agent such as hydrogen under conditions effective to restore its activity, following which the regenerated catalyst may be recycled to the reactor.

Also it is contemplated that catalyst discharged from the system may be reworked so as to produce fresh, highly active catalyst.

Any make-up catalyst required is conducted from a source not shown through a conduit 42 which communicates with the previously mentioned pipe 41.

If desired, at least a portion of the catalyst drawn off from the settler 19 may be conducted through a pipe 43 to the saturating vessel 28 for return to the reactor 5 as a component of the saturated mixture previously referred to.

As indicated in the drawing, make-up liquid suitable as a suspension medium for the catalyst may be drawn from a source not shown through a pipe 44 and passed to the saturating vessel 28. This make-up liquid may be a portion of the higher boiling hydrocarbons produced in the reaction.

Thus, in actual operation there is continually introduced to the reactor 5 a stream of liquid having powdered catalyst suspended therein, which suspension is introduced at a point or points above the previously mentioned distributor 31. In addition there is also introduced to the reactor 5 a stream of liquid from the pipe 30 which is saturated with gas under a pressure substantially above that prevailing in the reactor 5. Consequently, upon reduction of the pressure by the control valve 45 gas contained in the entering mixture escapes therefrom with the formation of many small bubbles of gas causing at least a substantial portion of liquid and catalyst to be transformed into a froth or foam in which the area of catalyst-gas interface becomes quite large. This extended interface thus provides material increase in the effective catalyst surface thereby facilitating catalytic conversion.

Mention has already been made of passing carbon monoxide and hydrogen directly to the reactor 5 through the heater 3. It is contemplated, however, that all or part of either one of these reactants may be introduced directly to the reactor 5 while all or a part of the other is used for saturating the liquid in the saturator 28.

At any rate the introduction of carbon monoxide and hydrogen is adjusted so that these reactants will be present in the reactor 5 in the proportion of about 2 mols of hydrogen to 1 mol of carbon monoxide, the exact proportions being varied so that the ratio of hydrogen to carbon monoxide is either greater than or less than 2:1 depending upon the catalyst employed and the nature of the product desired.

The powdered catalyst used may comprise about 32% cobalt, 64% diatomaceous earth (Filter Cel) and about 4% thorium and magnesium oxides. However, it is contemplated that the catalyst may be composed of other substances. For example, iron or nickel may be used instead of cobalt; fuller's earth or silica gel in place of the Filter Cel; and other promoters in place of thorium oxide, as, for example, the oxides of manganese, uranium and vanadium.

The temperature maintained within the reactor 5 will depend in part upon the type of catalyst employed and in the case of a cobalt catalyst will usually be in the range about 350 to 480° F. However, it is contemplated that temperatures within the range about 250 to 750° F. may be employed and likewise the pressure within the reactor 5 may vary from atmospheric to as high as 3000 pounds.

While not shown in the drawing, provision can be made for removing the exothermic heat of reaction. Tubular cooling elements, with or without fins, may be provided within the reactor 5 through which a suitable cooling fluid is circulated. On the other hand provision may be made for introducing the saturated liquid at a reduced temperature, or for introducing at successive points gaseous reactants or other gases under sufficiently high pressure that expansion within the reactor results in substantial cooling while assisting in maintaining the foam condition within the reactor.

A suitable cut of the hydrocarbon product may be recycled to the reactor to vaporize therein with refrigerative effect. Various other methods for effecting cooling may be used including cooling of streams being recycled to the reactor through pipes 30 and 41.

If desired some of the emulsion or mixture accumulating in the bottom of the vessel 16 may be recycled, with or without cooling, directly to the reactor.

Addition or diluent agents may be introduced to the reaction zone. For example, olefins, preferably normally gaseous olefins may be introduced through a pipe 56.

Mention has been made of utilizing the finely divided catalyst as a foam stabilizing agent, but it is contemplated that auxiliary substances may be used for this purpose or to augment the stabilizing influence of the catalyst.

Capillary-active substances having low surface tension and low vapor pressure at the reaction conditions are favorable for promotion of the foaming process. Organic salts and acids, sugars, glycerines, alcohols and esters are capillary-active substances which promote foaming under proper conditions of concentration, solubility and viscosity.

The employment of a fraction of the reaction product as a carrier liquid has been described. However, other liquids may be used for this purpose such as oxygenated organic compounds including alcohols, ethers and esters containing about 20 carbon atoms per molecule. Petroleum hydrocarbons such as heavy lubricating oils may be used. The carrier liquid may be a material which is substantially inert under the conditions prevailing within the reaction zone. It may be substantially non-vaporizable under the reaction temperature and pressure conditions prevailing within the reaction zone although it is contemplated that if desired it may be at least partially vaporizable under these conditions so as to facilitate cooling of the reaction zone by refrigerative effect.

Obviously many modifications and variations of the invention, as hereinbefore set forth, may be made without departing from the spirit and scope thereof, and therefore only such limitations should be imposed as are indicated in the appended claims.

We claim:
1. A continuous process for reacting carbon monoxide with hydrogen under predetermined conditions of temperature in the range of about 250 to 750° F. and of pressure in the range atmospheric and substantially above to produce hydrocarbons and the like which comprises saturating a stream of liquid substantially inert and substantially non-vaporizable under said predetermined conditions with gas under a pressure substantially above said predetermined pressure, continuously introducing said saturated stream to the lower portion of a reaction tower, continuously introducing to the lower portion of said tower at a point above the point of saturated stream entry a slurry of powdered solid hydrogenating catalyst in hydrocarbon liquid, expanding the introduced saturated stream within the reaction zone in the presence of said slurry thereby substantially filling the reaction tower with a continuous mass of foam containing solid catalyst powder suspended therein and providing an extended catalyst-gas interfacial area, continuously passing carbon monoxide and hydrogen through the reaction zone in contact with said foam under said predetermined conditions such that substantial reaction occurs, and continuously withdrawing from the upper portion of the reaction tower a mixture of foam, catalyst and products of reaction.

2. The method according to claim 1 in which the powdered catalyst comprises a hydrogenating agent selected from the group consisting of cobalt, iron and nickel and a promoter selected from the group consisting of the oxides of thorium, manganese, vanadium and uranium in association with a solid adsorptive material.

3. In the conversion of carbon monoxide and hydrogen into products of higher molecular weight by contact with a powdered solid synthesis catalyst in a reaction tower under predetermined operating conditions of pressure and elevated temperature for said conversion, wherein the reactant gases are passed through a mass of foam containing said powdered synthesis catalyst dispersed therein, the method of creating and maintaining said catalyst-containing foam which comprises separately incorporating gas in substantial amount in a liquid under a pressure substantially above said predetermined converted pressure, said liquid being substantially inert and non-vaporizable under said reaction conditions, continuously introducing a stream of said gas-liquid mixture to the reaction tower, with the spontaneous internal formation of small bubbles forming an expanded foam, and concurrently introducing said catalyst powder into the locality of said expanding gas liquid mixture.

4. In the conversion of carbon monoxide and hydrogen into products of higher molecular weight by contact in a reaction tower under predetermined conditions of pressure and elevated temperature with a solid synthesis catalyst wherein the reactant gases are passed through a mass of foam containing powdered synthesis catalyst dispersed therein, the method of creating and maintaining said catalyst-containing foam which comprises separately incorporating gas in substantial amount in a liquid under a pressure substantially above said predetermined pressure, said liquid being substantially inert and non-vaporizable under said reaction conditions, continuously introducing a stream of said gas-liquid mixture to the lower portion of the reaction tower, separately and continuously introducing to the tower at an elevation above the point of introduction of said first mentioned stream a slurry of said catalyst powder in liquid, and expanding said gas containing mixture within the reaction zone in the presence of said introduced slurry.

5. The method according to claim 3, in which the gas incorporated in said inert liquid is also substantially inert under the conditions of reaction.

6. The method according to claim 3, in which the catalyst powder is characterized by having an average particle diameter in the range of about 0.01 to 0.0001 inch.

7. A continuous process for reacting carbon monoxide and hydrogen to produce compounds of higher molecular weight by contact with a solid synthesis catalyst in a vertical reaction zone maintained under predetermined reaction conditions of pressure and elevated temperature which comprises separately incorporating gas in substantial amount in a liquid under a pressure substantially above said predetermined pressure, said liquid being substantially inert and non-vaporizable under said reaction conditions, continuously introducing a stream of said gas-liquid mixture to the lower portion of the reaction zone, continuously introducing to the reaction zone at an elevation above the point of introduction of said gas-containing mixture a slurry of powdered synthesis catalyst in liquid, expanding the introduced gas-containing mixture within the reaction zone in the presence of said slurry, filling the reaction zone substantially with a continuous mass of foam containing powdered catalyst dispersed therein, introducing carbon monoxide and hydrogen to the lower portion of said zone and passing so introduced carbon monoxide and hydrogen in contact with said foam under said predetermined conditions such that substantial reaction occurs, continuously withdrawing products of reaction from the upper portion of the reaction zone, also continuously withdrawing from the upper portion of said zone an effluent comprising foam, catalyst and slurry liquid, breaking down said foam, recovering catalyst therefrom, and returning recovered catalyst to said reaction zone in slurry form.

MEREDITH M. STEWART.
ROBERT C. GARRETT.
EUGENE E. SENSEL.

REFERENCES CITED

The following references are of record in the file of this patent:

UNITED STATES PATENTS

| Number | Name | Date |
|---|---|---|
| 2,127,127 | Martin | Aug. 16, 1938 |
| 2,159,077 | Duftschmidt | May 23, 1939 |
| 2,161,974 | Peck | June 13, 1939 |
| 2,361,997 | Dreyfus | Nov. 7, 1944 |

OTHER REFERENCES

Biesalski, Zeit. Angew. Chemie. 41 (1928), pp. 853–6. (Copy in Patent Office Library.)